Nov. 2, 1926.

F. M. SCHULER 1,605,903

STARCH VENEERING PROCESS AND APPARATUS

Filed May 4, 1925 2 Sheets-Sheet 1

INVENTOR
FRANK M. SCHULER
BY HIS ATTORNEYS

Nov. 2, 1926.  1,605,903
F. M. SCHULER
STARCH VENEERING PROCESS AND APPARATUS
Filed May 4, 1925 2 Sheets-Sheet 2
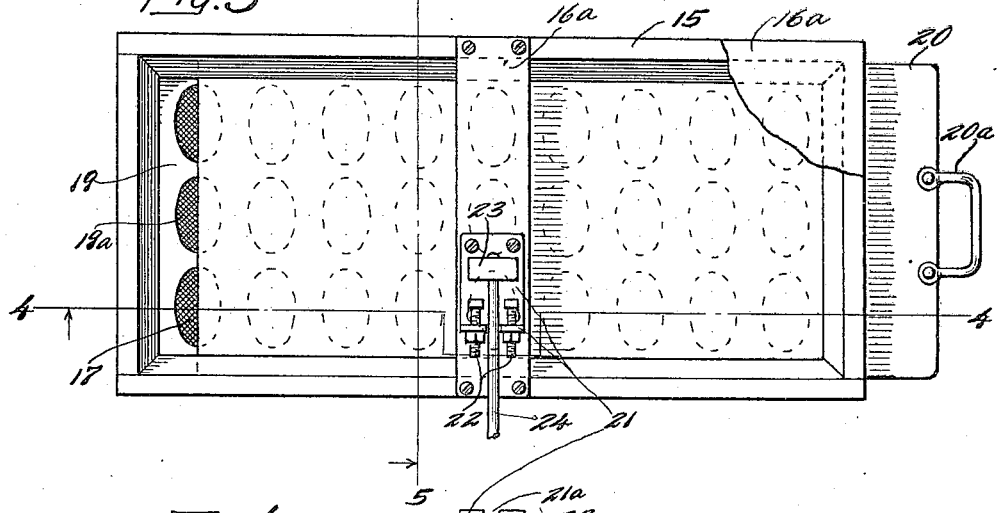
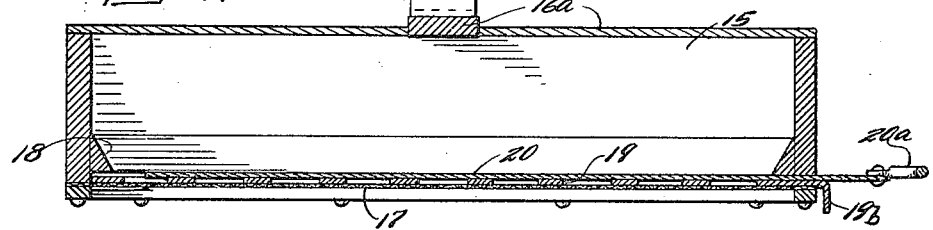
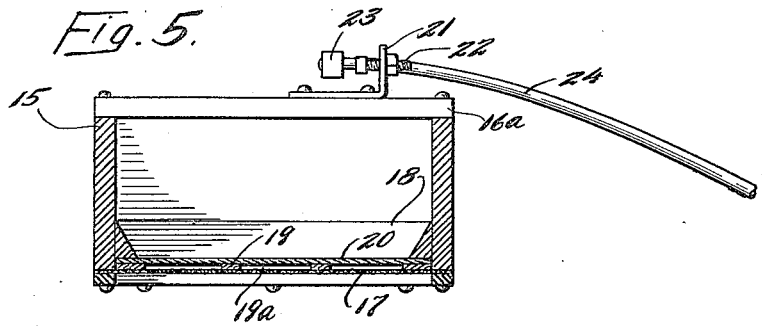
INVENTOR
FRANK M. SCHULER
BY HIS ATTORNEYS Patented Nov. 2, 1926.

1,605,903

UNITED STATES PATENT OFFICE.

FRANK M. SCHULER, OF WINONA, MINNESOTA.

STARCH VENEERING PROCESS AND APPARATUS.

Application filed May 4, 1925. Serial No. 27,806.

This invention relates to a candy making process and apparatus, particularly to such a process and apparatus for use in making coated candy pieces which are formed in starch molds. As is well known to those skilled in the art, a great deal of candy is now made in a candy machine in which shallow boxes or trays filled with comminuted starch are used. Impressions or molds are printed in the starch and the candy, together with nuts, cherries, etc., contained therein is subsequently placed in said molds. The starch in the trays is used over and over and must be separated from the candy after each tray full has been used. Frequent cleaning of the starch is also necessary to separate therefrom small pieces of the candy material. The starch is hardened more or less from contact with the candy material and the same becomes less suitable for use with the repeated usings thereof. It has been the practice to add new and fresh starch to the starch supply, but in spite of this fact, imperfect and inferior pieces of candy are made, due to the deterioration of the starch from use and to the fact that small pieces of candy material remain therein and are objectionable when located in the molds.

It is an object of this invention, therefore, to provide a simple and efficient process and apparatus whereby the candy material will come into contact with clean fresh starch and the mold cavities will be lined with clean fresh starch.

It is a further object of the invention to provide a candy making process in which the starch filled trays are used and in which a layer or veneer of fresh starch is disposed on the starch in the tray at the point where the impression mold is made.

It is a further object of the invention to provide a process in which a layer of fresh clean starch is deposited on the starch in the filled starch tray and the impression or mold is then formed within the area covered by such layer.

It is a further object of the invention to provide a process in which the filled starch tray is used and a layer of fresh clean starch is deposited thereon over spaced areas, which areas coincide with the areas in which the mold or impressions are made.

It is also an object of the invention to provide an apparatus including means for supporting a starch tray, means for depositing thereon a layer of fresh clean starch, and means for making molds or impressions in said starch.

It is a further object of the invention to provide an apparatus having means for supporting and traversing a tray filled with starch, a means for depositing on said starch filled tray a layer of fresh clean starch over a plurality of spaced areas on said tray, together with means for subsequently forming molds or impressions in said starch tray within said areas.

These and other objects and advantages of the invention will be fully set forth in the following description made in connection with the accompanying drawings in which like reference characters refer to the same parts throughout the different views, and in which Fig. 1 is a view in side elevation of a portion of a candy making machine, a part thereof being shown in vertical section;

Fig. 3 is a top plan view of a starch receptacle and parts carried thereby;

Fig. 4 is a vertical section taken on the line 4—4 of Fig. 3, as indicated by the arrows; and Fig. 5 is a vertical section taken on the line 5—5 of Fig. 3, as indicated by the arrows.

Figure 1:
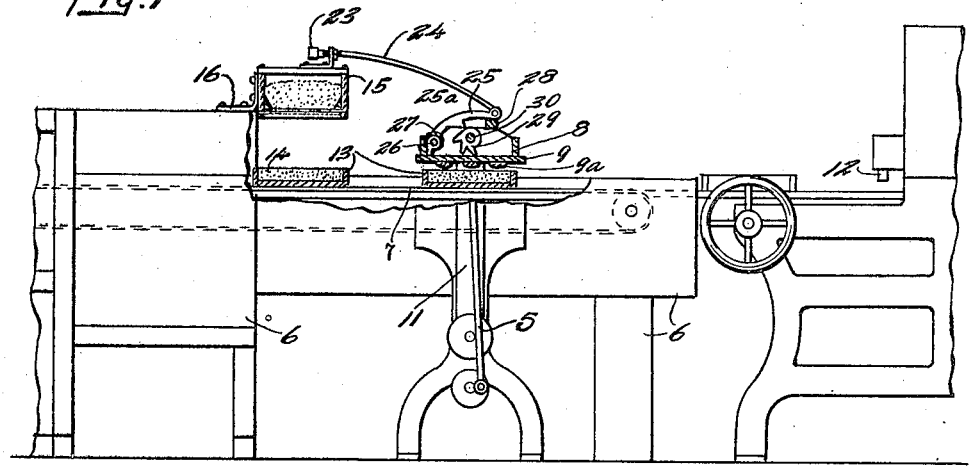
Figure 2:
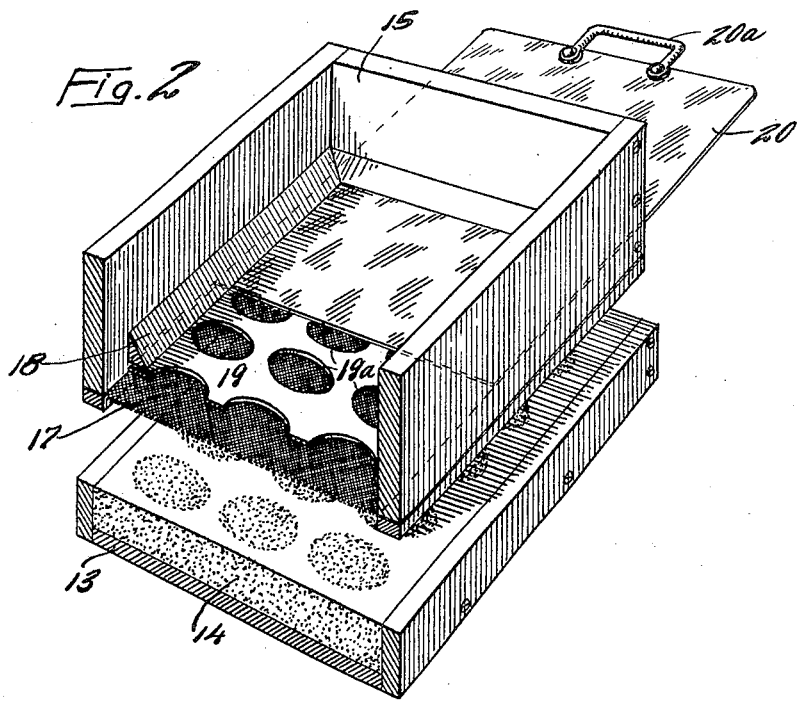
Fig. 2 is a perspective view also partly in vertical section, of certain parts of said machine.

Referring to the drawings, particularly Fig. 1, a portion of a candy making machine is shown, in which it will only be necessary to consider the frame 6 and traveling carrier 7 adjacent the top thereof, the reciprocating printer 8 which is reciprocated vertically by a pitman 5 connected to a crank disk 10, said printer being guided vertically in guides 11. A depositor for fluid or semi-fluid candy material is also indicated at 12. The said parts of the machine are common and well known in the art. The printer 8 has a print board 9 which extends across the machine and has projecting from its lower surface, a plurality of spaced matrices 9ª adapted when the printer is reciprocated to form impressions or molds in the starch in the tray 13. Starch trays comprising shallow boxes 13 are used of rectangular shape and these boxes contain and are filled to their top edges with a supply of comminuted starch 14, said trays being filled and progressed through the machine on the carrier 7.

In accordance with the present invention, a starch receptacle 15 is provided secured to the frame of the machine by suitable brackets 16. While the starch container 15 might be made in various ways, in the embodiment of the invention illustrated, it is shown as a rectangular box extending longitudinally across the machine above the carrier 7 and of substantially the same size as, or of slightly larger size in horizontal cross section than the starch trays 13. The receptacle 15 is provided with a perforated or screen bottom 17. A strip 18 triangular in cross section is shown as extending around the box 15 close to and slightly spaced from the screen 17. A plate 19 is disposed on top of screen 17, which plate may be slid into container 15 through a slot in one end and between strip 18 and said screen. The plate 19 has a plurality of holes 19$^a$ therethrough and, in practice, these holes will be of the same number and arrangement as the matrices 9$^a$ on the print board 9. The plate 19 has an end portion 19$^b$ bent to form a handle means for inserting and withdrawing said plate. An imperforate plate 20 is also provided adapted to be inserted in container 15 above plate 19, said plate having a handle 20$^a$ thereon by means of which it can be inserted and withdrawn. The container 15 is provided with a cover 16$^a$ and a bracket 21 shown as of angle shape, is secured to said cover, said bracket having a slot 21$^a$ centrally disposed in its upstanding side. A pair of headed screws 22 are threaded into said plate at the sides of slot 21$^a$, said screws being provided with a jamb nut contacting bracket 21. A knocker comprising a weight or head 23 is provided from which extends an arm 24, said arm extending through slot 21$^a$ downwardly in an inclined direction where it is secured to an operating member 25. While various means may be used to operate the arm 24, in the embodiment of the invention illustrated, it is shown as connected to the arm 25 which is pivoted at 26 at one side of the printer 8. This lever 25 is part of the standard equipment of the candy making machine and is spring pressed by a spring 27 on the pivot 26 to hold a bar 28 against the top of printer 8. The arm 25 is intermittently raised by a toothed segment 29 carried on a rotating shaft 30, said segment engaging a tooth 25$^a$ on arm 25. Each time a tooth on the segment passes tooth 25$^a$ the arm 25 and bar 28 are returned by spring 27 so that bar 28 strikes the top of the printer a blow.

In the operation of the machine, the trays 13 are filled and progressed along the carrier 7 and at the top of the machine frame. The carrier is intermittently progressed so that the trays are momentarily held in stationary position. The trays come under the printer 8 and the said printer, with the print board 9, is reciprocated to form the molds or impressions in the starch in the tray. As stated, the bar 28 on arm 25 is raised and released so that said bar strikes the printer several blows. This is done to prevent the printer carrying any starch upward. As a tray is stopped beneath the printer 8 a following tray will be stopped beneath and alined with the receptacle 15. A supply of fresh clean starch which has not previously been used in the machine will be maintained in receptacle 15. As the arm 25 is operated, the arm 24 will be moved longitudinally and the head 23 will strike the ends of the screws 22 a sharp blow. This blow will be transmitted to the casing 15 which will be jarred and the shower of starch will be delivered through the opening 19$^a$ and screen 17 on the tray beneath receptacle 15, it being understood that plate 20 is at this time not in the casing 15. A layer or veneer of fresh, clean starch will thus be deposited on top of the starch in the tray 13 and this layer will be deposited over spaced areas within which areas the molds or impressions will subsequently be made. The surface of the molds or impressions will thus be formed of fresh clean starch, or, in other words, the molds will be lined with this layer of fresh clean starch. The force of the blow given to the receptacle 15 can be varied by adjustment of the screws 22. The plate 20 is inserted in the receptacle 15 when it is desired to place starch therein so that the starch will not be precipitated through the screen 17 and wasted. The molds having been made in the tray the tray is advanced and the candy material is deposited in the molds. While the layer of starch may be deposited after the impressions are printed, it preferably is done before, as described.

From the above description it is seen that applicant has provided a greatly improved method and apparatus for forming the candy pieces. By having a fresh clean starch forming the outer surface of the molds, greatly improved results are obtained. The pieces of candy are frequently made to contain cherries, usually maraschino cherries. These cherries will not absorb an appreciable quantity of fresh clean starch. It is undesirable to have the cherries absorb and pick up any appreciable amount of starch as the starch is then carried into the candy piece. The cherries will absorb old starch which has become deteriorated through use and a lump of starch is thus formed in the candy piece. This undesirable result is eliminated in applicant's process and apparatus. When sticky chocolate is used in the molds much less starch will be picked up. This is particularly true in hot weather or when the temperature is high in the operating room. After the candy pieces are made it has been the custom in the prior practice to brush the pieces to remove the adhering starch. With applicant's process, very little of the fresh clean starch is picked up by the chocolate and brushing is practically eliminated. It is also possible to make pieces coated with softer chocolate than heretofore. It has been necessary to renew the starch at frequent intervals. With applicant's process the starch can be used for a much longer time as the old starch does not come in contact with the piece of candy. Owing to the fact that the fresh clean starch is not readily picked up by the fruits it is possible to place many of the fruits and other articles directly into the molds without first placing a tip or filler of fondant or other material in the mold, as has been the prior practice. The process results in a great saving of starch, in spite of the use of fresh clean starch. A comparatively small quantity of the fresh clean starch is used and a great saving is effected in that the old starch is used longer and it is not necessary to continually add a larger increment of new fresh starch.

From the above description, the high degree of utility and the advantageous and new results obtained by applicant's process and apparatus will be apparent. The process and apparatus have been used for sometime in a large candy making establishment and found to be very successful and efficient.

It will, of course, be understood, that various changes may be made in the form, details, arrangement and proportions of the parts and in the steps and sequence of the steps of the process without departing from the scope of applicant's invention, which, generally stated, consists in a process and apparatus capable of carrying out the objects above set forth, such as disclosed and defined in the appended claims.

What is claimed is:

1. The process of making pieces of candy which comprises providing a tray of starch, depositing a layer of fresh clean starch thereon, printing an impression in the starch in said tray and then depositing the candy material in said impression.

2. The process of making candy pieces which consists in providing a tray of starch adapted to have impressions made therein and placing a layer or veneer coating of fresh clean starch on said starch in said tray over an area co-incident with the area within which the impressions are made and before any candy material is deposited in said impressions.

3. The process of making candy pieces which consists in providing a tray of starch, depositing a layer of fresh starch on top of said starch in said tray over spaced areas, making impressions in said starch in said tray within said areas and placing the candy material in said impressions.

4. A candy making apparatus comprising a tray of starch, means for supporting and intermittently traversing the same, means for depositing a thin layer of fresh starch on the starch in said tray, and means for subsequently making a plurality of impressions or molds in the starch.

5. A candy making apparatus having in combination, a tray of starch, means for supporting and traversing the same, a starch receptacle above said means having a perforated bottom, means for causing a quantity of starch to be precipitated from said receptacle onto said tray, and means spaced from said starch receptacle in the direction of travel of said first mentioned means for forming a plurality of impressions in said tray.

6. The structure set forth in claim 5, a plate having a plurality of holes therein adjacent the bottom of said receptacle, said holes being of the same number and arrangement as the plurality of impressions made in said tray.

7. The structure set forth in claim 5, and an imperforate plate adapted to be inserted in said receptacle above said screen.

8. The structure set forth in claim 5, said second mentioned means comprising a knocker carried on a resilient arm for jarring the receptacle, and means for raising and releasing said arm to cause said knocker to jar said receptacle.

9. A candy making apparatus having in combination, a tray containing starch, means for supporting said tray, means for depositing a layer of fresh starch on top of the starch in said tray over spaced areas, and means for subsequently printing impressions in said areas.

10. A candy making apparatus having in combination, a tray of starch, means for supporting and traversing the same, a receptacle adapted to contain clean starch above said means having a screen bottom, a knocker for jarring said receptacle, adjustable means for regulating the blow of said knocker, and means intermittently operating said knocker.

11. The structure set forth in claim 10, means for printing a plurality of impressions in said starch in said tray, and means operated from said last mentioned means for operating said knocker.

In testimony whereof I affix my signature.

FRANK M. SCHULER.